United States Patent [19]

Thier et al.

[11] Patent Number: 5,509,258
[45] Date of Patent: Apr. 23, 1996

[54] OPERATOR PRESENCE CONTROL FOR REEL MOWER

[75] Inventors: Richard D. Thier, Juneau; Howard V. Speer; Phillip O. Swenson, both of Beaver Dam, all of Wis.

[73] Assignee: Deere & Company, Moline, Ill.

[21] Appl. No.: 380,272

[22] Filed: Jan. 30, 1995

[51] Int. Cl.$^6$ .................................................. A01D 34/68
[52] U.S. Cl. .................... 56/11.3; 56/11.7; 56/DIG. 6; 56/DIG. 18; 180/19.3
[58] Field of Search .................................. 56/11.3, 11.7, 56/10.8, 16.9, DIG. 4, DIG. 6, DIG. 18; 180/19.3, 19.2, 19.1

[56] References Cited

U.S. PATENT DOCUMENTS

| | | | |
|---|---|---|---|
| 4,667,459 | 5/1987 | Scanland et al. | 180/19.3 X |
| 4,850,182 | 7/1989 | Barnard et al. | 56/10.8 |
| 4,930,369 | 6/1990 | Barnard et al. | 74/480 R |
| 5,020,308 | 6/1991 | Braun et al. | 56/11.3 |
| 5,197,577 | 3/1993 | Hayek | 56/11.3 X |

OTHER PUBLICATIONS

Deere & Co., brochure entitled, "John Deere Walk-Behind Green Mowers", 4 pages, dated Jan. 1992, published in the U.S.A.

John Deere Horicon Works, Operator's Manual entitled, "14SB and 14SE 21-inch Walk-Behind Rotary Mowers", dated approximately Sep. 1992, 7 pages, published in the U.S.A.

The Toro Company, brochure entitled, "Greensmaster 1000 and Greensmaster 500, The Leading Choice in Walk Greens Mowers", 4 pages, dated 1993, published in the U.S.A.

Jacobsen, Div. of Textron, Inc., brochure entitled, "With the Jacobsen GreensKing 422, It's a Whole New Ballgame", 4 pages, dated 1992, published in the U.S.A.

*Primary Examiner*—Terry Lee Melius

[57] ABSTRACT

An operator presence mechanism for a walk-behind reel mower having a drive lever control engagable for initiating forward travel of the mower, the drive lever being shiftable to intermediate positions for inching the mower forward, the drive lever being biased to return to a non-driven position when an operator releases the lever from the intermediate positions. A locking linkage is provided for generally locking the drive lever in its fully engaged position and which allows the drive lever to shift back to its non-driven position when an operator releases the drive lever in the intermediate positions. An operator presence lever is operatively coupled with the drive lever for returning the drive lever to the non-driven position when the operator presence lever is disengaged. A lockout linkage is coupled between the drive lever and the operator presence lever for preventing the drive lever from being engaged without the operator presence lever being engaged.

11 Claims, 5 Drawing Sheets

OPERATOR PRESENCE CONTROL FOR REEL MOWER

BACKGROUND OF THE INVENTION

This invention relates to walk behind reel mowers used for mowing golf course greens, and the operator controls for such greens mowers.

It is known to provide reel mowers with a lever which when pivoted initiates the drive mechanism which propels the mower forward. When the operator pivots the lever to its fully engaged position, a locking mechanism holds the lever in its fully engaged position. The operator typically will mow back and forth across a golf course green and keep the mower in a driven mode during the entire mowing operation. When the operator executes a turn he typically will keep the mower in its driven mode and merely turn the mower as it is being driven. A differential allows the mower to be turned easily while it is being driven. When the operator has completed mowing the green he must reach down and manually return the lever to its non-driving position in order to stop the mower's forward travel. These greens mowers generally do not provide an operator presence feature. When maneuvering the mower in confined spaces, the operator can pivot the drive lever slightly from the non-driven position for inching the mower forward in a controlled manner. When the operator releases the drive lever while inching the mower forward the lever will spring back to its non-driven position.

Walk-behind rotary mowers have been provided with operator presence features. One type of rotary mower operator presence mechanism provides a bale which stops the engine when the bale is released. Another type of rotary mower provides a bale which stops rotation of the blade when the bale is released.

It would be desirable to provide a walk-behind reel mower with an operator presence mechanism which return the mower to a non-driving mode when the operator removes his hands from the controls. It would also be desirable for such a mechanism to be simple in construction, made of few parts and relatively easy and inexpensive to manufacture.

SUMMARY OF THE INVENTION

The preferred embodiment of the present invention provides an operator presence linkage for a walk-behind reel mower adapted for mowing golf course greens. A drive control lever is provided which can be shifted by the operator for initiating forward travel of the mower. The drive lever has a non-driven position whereat the mower is not driven forward, and a fully engaged position whereat the mower is at full forward speed. The drive lever also has intermediate positions for inching said mower forward. The drive lever is biased to return to the non-driven position when the operator releases the lever from the intermediate positions. An operator presence lever is provided which is operatively coupled with the drive lever for returning the drive lever to the non-driven position when the operator presence lever is disengaged. A lockout linkage is coupled between the drive lever and the operator presence lever for preventing the drive lever from being engaged without the operator presence lever being engaged. The lockout linkage includes a portion of a first cam member fixed with the drive lever, and a second cam member fixed for rotation with the operator presence lever. The second cam member has an interference member which blocks said first cam member and drive lever from rotating from the non-driven position when the operator presence lever is disengaged. The interference member pivots with the operator presence lever for providing clearance for the first cam member to pivot to the intermediate and the fully engaged positions when the operator presence lever is engaged. A locking linkage is provided for generally locking the drive lever in its fully engaged position. The lockout linkage includes a third cam member operatively coupled with the second cam member for limited relative pivoting therebetween. The third cam member includes a finger member which is generally biased to drop down over a ledge portion of the first cam member when the drive lever and operator presence lever are fully engaged. Abutment of the finger portion and ledge portion generally blocks or prevents the first cam member and drive lever from returning to the non-driven mode while the operator presence lever is engaged. When the operator releases the operator presence lever, the finger portion generally pivots therewith, and will become disengaged from the ledge portion for providing clearance for the first cam member and drive lever to return to the non-driven position. A single spring is provided which serves the dual function of biasing the operator presence lever to the non-driven position and biasing the finger portion of the third cam member into engagement with the first cam member.

DESCRIPTION OF THE PREFERRED EMBODIMENT

Figure 1:
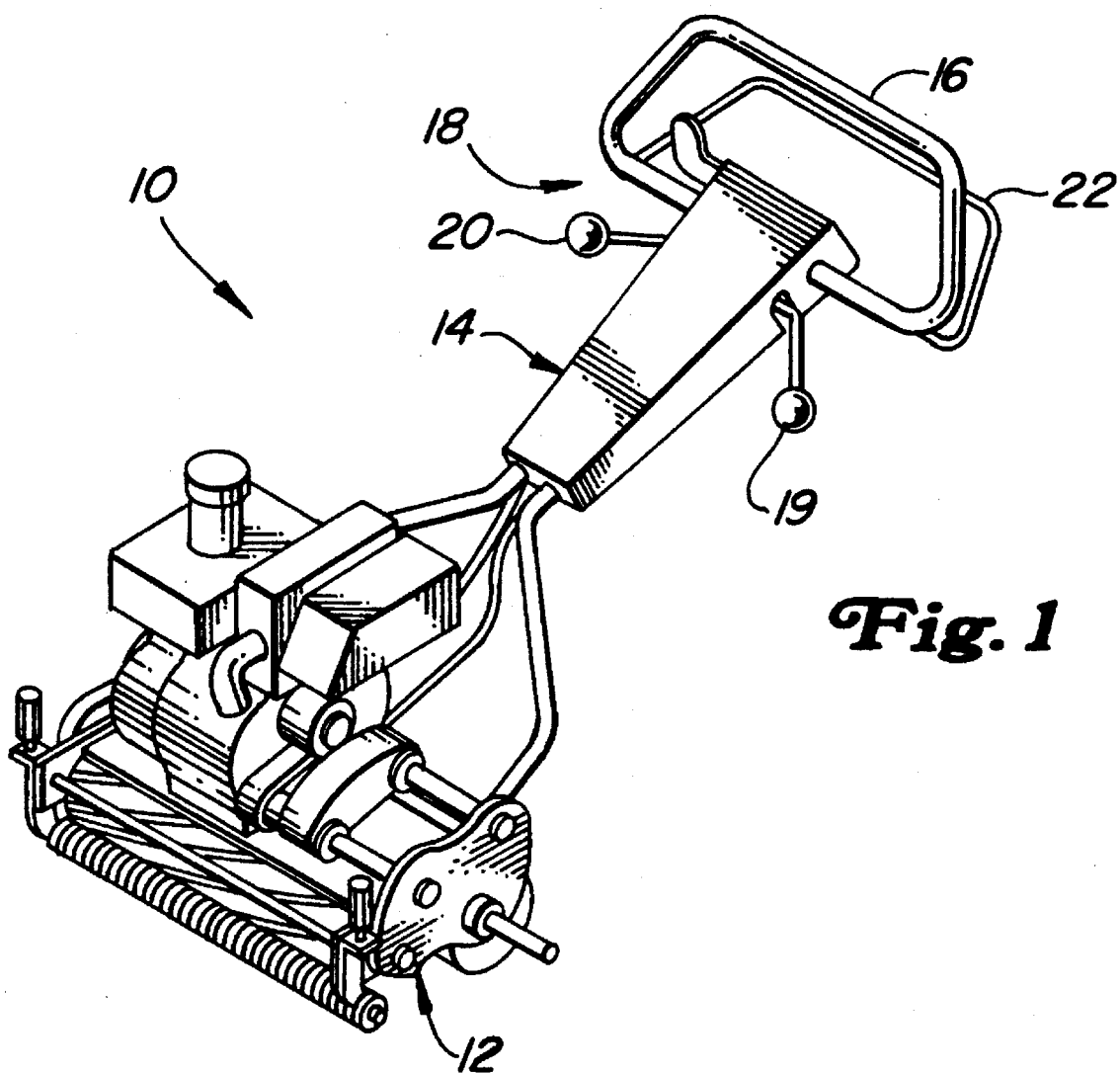
FIG. 1 illustrates a walk-behind reel mower according to the preferred embodiment of the present invention.

Referring now to FIGS. 1, there is shown a walk-behind reel mower 10 according to the preferred embodiment of the present invention adapted for mowing golf course greens. The mower 10 includes a reel mower cutting unit 12 at the front of the mower 10, and an upwardly and rearwardly extending handle structure 14. The operator grasps a handle 16 for generally directing the mower 10. The mower 10 includes hand controls 18 which allow the operator to control the operation of the mower 10. A parking brake lever 19 is provided which can be pivoted by the operator for engaging and disengaging a parking brake. A drive lever or drive clutch engagement lever 20 is provided which can be pivoted by the operator to control forward travel of the mower 10. An operator presence bale lever 22 is provide which prevents the drive lever 20 from being pivoted from a non-driving mode when the bale 22 is not engaged.

Figure 2:
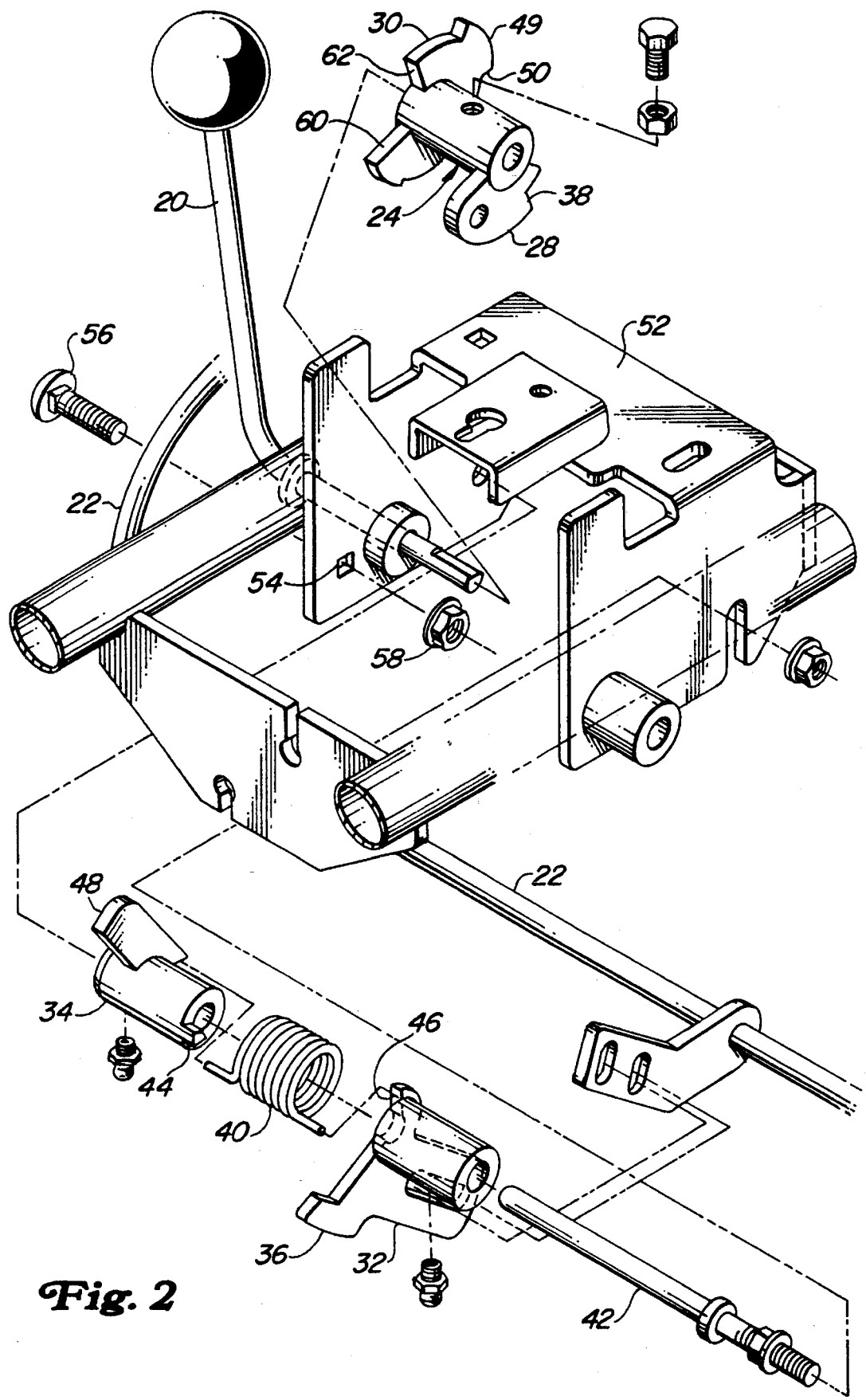
FIG. 2 is an exploded view of the linkage according to the preferred embodiment of the present invention.
Figure 3:
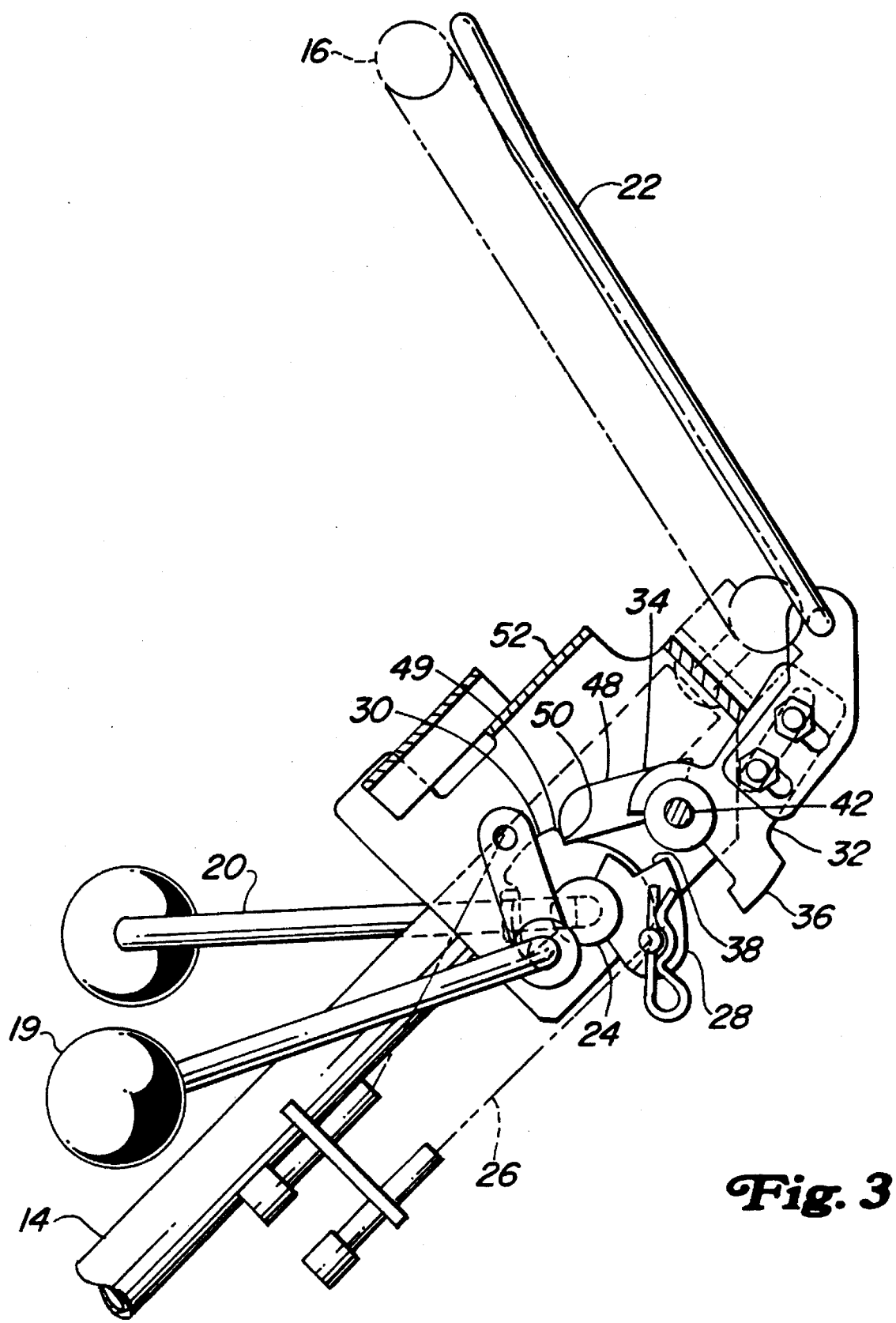
FIG. 3 is a side view of the controls and operator presence mechanism according to the preferred embodiment of the present invention with the operator presence bale lever 22 fully engaged and the drive lever 20 fully engaged for full forward travel.
Figure 4:
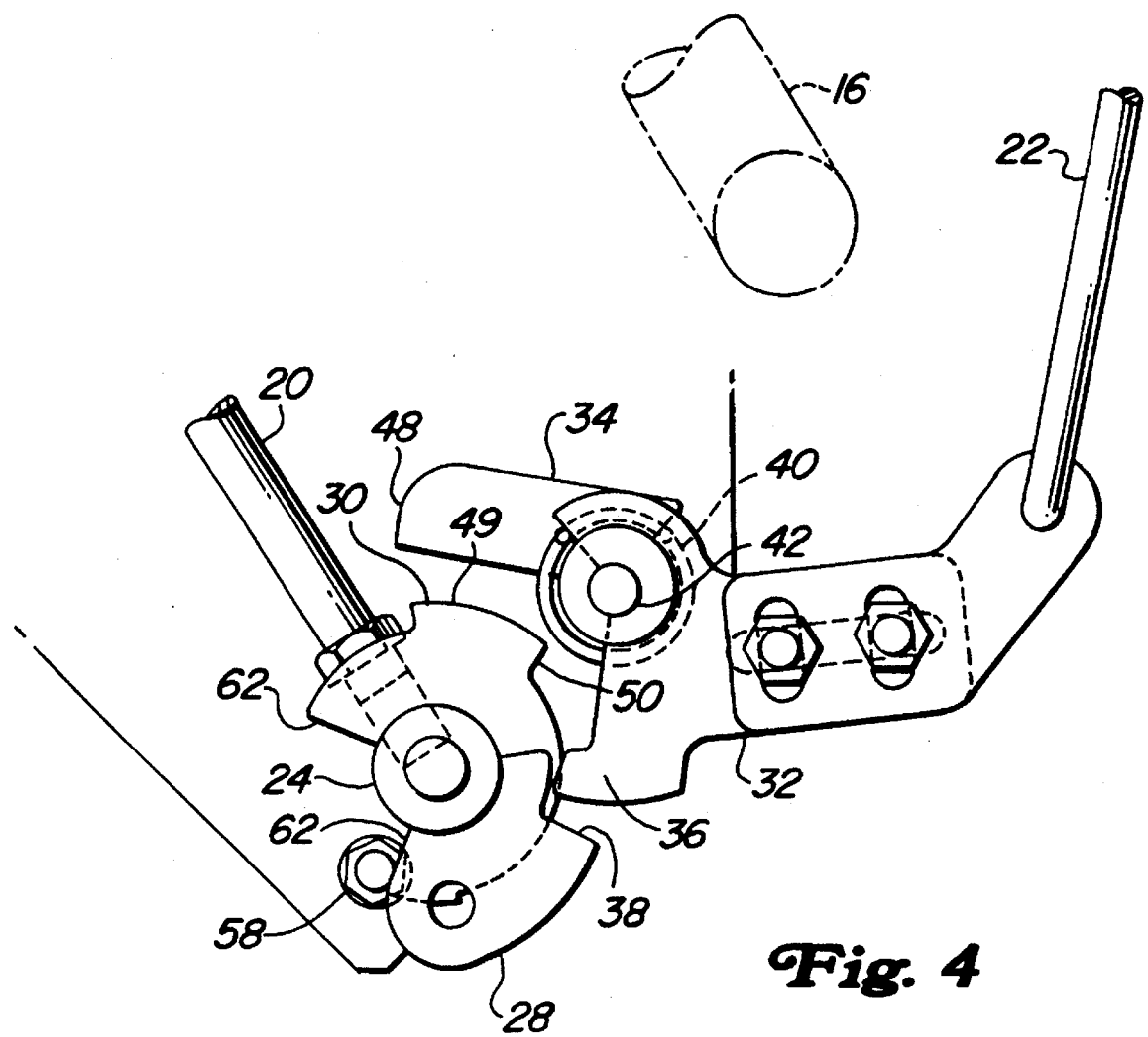
FIG. 4 is a partial side view of the operator presence mechanism showing the operator presence bale lever 22 released or disengaged and the drive lever 20 in its stopped or non-driven position.

Next, the linkage which operatively connects the operator presence bale arm 22 with the drive lever 20 will be discussed. Referring now to FIG. 2, there is shown an exploded view of the linkage for the operator presence mechanism according to the present invention. A first cam member 24 is fixed for rotation with the drive lever 20. The first cam member 24 is coupled with a cable 26 which extends to the mower's clutch mechanism (not shown). As the drive lever 20 is pivoted forwardly and downwardly to the driving position, as shown in FIG. 3, the first cam member 24 pivots therewith and pulls the cable 26, thereby engaging the clutch which drives the mower 10 forward. The first cam member 24 includes first and second radially extending portions 28 and 30 which engage second and third cam members 32 and 34, respectively. The second cam member 32 is fixed for rotation with the operator presence bale arm 22. An interference member 36 protrudes radially from the second cam member 32. When the bale arm 22 is not engaged by the operator, as illustrated in FIG. 4, the interference member 36 is positioned adjacent the first radially extending portion 28 of the first cam member 24. When the bale arm 22 is not fully engaged the interference member 36 will abut a surface 38 of the first radially extending portion 28 and generally prevent the first cam member 24 and drive lever 20 from pivoting from the disengaged position. The present invention thereby provides a lockout linkage which prevents the drive lever from being engaged without the operator presence lever being engaged. As the bale arm 22 is pivoted upwardly and forwardly by the operator to the position shown in FIGS. 3 and 5, the second cam member 32 pivots therewith, which shifts the interference member 36 out of the way of the surface 38 of the first cam member 24. Clearance is thereby provided for the first cam member 24 to pivot once the bale arm 22 is fully engaged, thereby allowing the operator to pivot the drive lever 20 forward to the position shown in FIG. 3 to initiate forward travel. A spring 40 engages the second cam member 32 for biasing the second cam member 32 and operator presence bale arm 22 to its disengaged position.

A rod 42 which pivotally supports the second cam member 32 also pivotally supports the third cam member 34, as shown in FIG. 2. The third cam member 34 has a mating portion 44 which generally mates with a portion 46 of the second cam member 32 for allowing limited pivotal movement between the second and third cam members 32 and 34. The function of this mating feature will be discussed in greater detail below. The spring 40 engages the third cam member 34 for biasing a finger portion 48 into engagement with a curved surface portion 49 of the second radially extending portion 30 of the first cam member 24. When the bale arm 22 is fully engaged by the operator the second cam member 32 pivots therewith, which allows the third cam member 34 and finger portion 48 to pivot downwardly until the finger portion 48 abuts the curved surface portion 49 of the first cam member 24. In this position the spring 40 which engages the first cam member 24 biases the finger portion 48 against the outer edge of second radially extending portion 30 of the first cam member 24. At this point, the interference member 36 has shifted out of the way of the first cam member 24 such that the drive lever 20 has clearance to be shifted by the operator for starting forward travel. As the operator pivots the drive lever 20 toward the fully engaged position as shown in FIG. 3, the first cam member 24 pivots until the finger portion 48 drops down over a ledge portion 50 formed in the second radially extending portion 30 of the first cam member 24. The spring 40 which engages the first cam member 24 biases the finger portion 48 to pivot downwardly over the ledge 50 once the drive lever 20 has been pivoted sufficiently. In this position, as shown in FIG. 3, the finger portion 48 will abut the ledge portion 50 to generally block or prevent the first cam member 24 and drive lever 20 from returning to the non-driven position. The present invention thereby provides a locking linkage which locks the drive lever 20 in a full forward travel mode such that the operator can mow an entire green without actuating any further controls.

The support bracket 52 which supports the hand controls 18 includes an opening 54 within which a bolt 56 is positioned. A nut 58 threaded onto the bolt 56 holds the bolt 56 in place within the opening 54. The bolt 556 acts as a stop for limiting pivotal movement of the first cam member 24 and drive lever 20. When the drive lever 20 and first cam member 24 are in a non-driving mode as shown in FIG. 4, the bolt 56 abuts against a surface 60 of the second radially extending portion 30 of the first cam member 24 for blocking or limiting movement of the first cam member 24 as shown in FIG. 4. Furthermore, when the operator pivots the drive lever 20 to the fully driven position shown in FIG. 3, the bolt 56 will abut against another surface 62 of the second radially extending portion 30 of the first cam member 24, thereby blocking or limiting the forward pivoting of the drive lever 20.

When the operator removes his hands from the bale arm 22 during full forward travel during mowing operations the spring 40 will force the second cam member 32 and bale arm 22 to pivot rearwardly and downwardly. As the bale arm 22 and second cam member 32 pivot to the rear under the force of the spring 40, the mating surfaces 44 and 46 formed between the second and third cam members 32 and 34 will contact each other, causing the third cam member 34 to pivot with the second cam member 32. The momentum of the pivoting bale arm 22 and second cam member 32 forces the bale arm 22, second cam member 32 and third cam member 34 to pivot rearwardly to the fully disengaged position. Since the third cam member 34 has pivoted with the second cam member 32 to the position shown in FIG. 4, the finger member 48 will have pivoted upwardly out of engagement with the ledge portion 50. Without the finger portion 48 blocking rotation of the first cam member 24, the first cam member 24 and drive lever 20 will pivot back to the non-driving mode as shown in FIG. 4 under the force of a clutch spring (not shown) which biases or pulls the cable 26 downwardly. The operator presence mechanism according to the preferred embodiment therefore disengages the mower's drive clutch when the operator disengages the bale arm 22.

Figure 5:
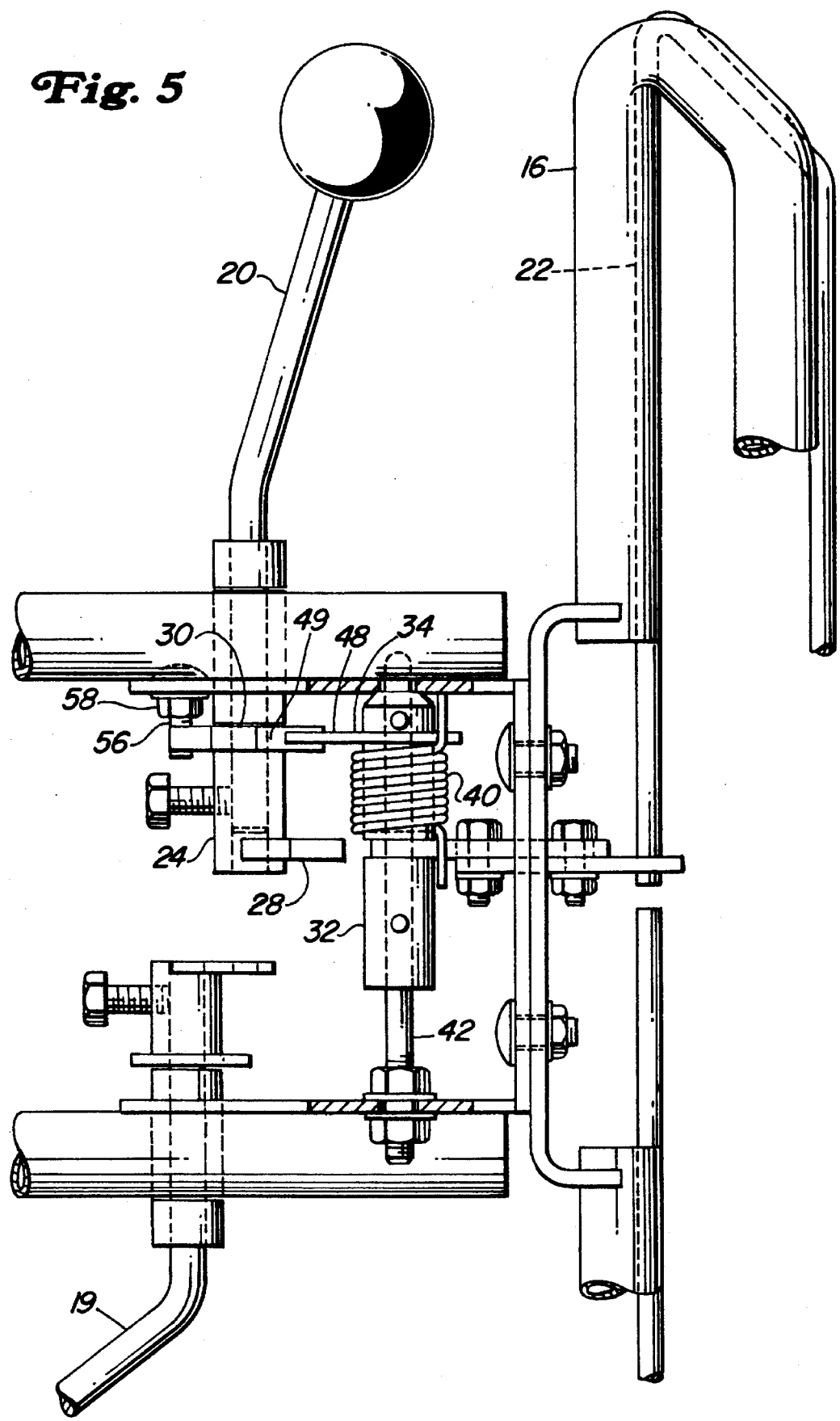
FIG. 5 is a view from above the controls according to the present invention and showing the bale lever 22 fully engaged and the drive lever in its stopped or non-driven position.

The operator presence mechanism according to the present invention allows the operator to shift the drive lever 20 to intermediate positions to inch the mower 10 forward when full drive engagement would be inappropriate, such as when driving the mower 10 up a ramp onto the bed of a truck for transport. With the bale 22 engaged by the operator, the operator can pivot the drive lever 20 slightly forwardly for feathering or inching the mower 10 forwardly. When the mower 10 is being inched forward in this manner, the finger portion 48 is in abutment with the curved surface portion 49 of the first cam member, as shown in FIG. 5. When inching the mower forward in this manner, the second radially extending portion 30 of the first cam member 24 will not be pivoted far enough to allow the finger portion 48 to drop down over the ledge portion 50. Therefore, the finger portion 48 does not lock the first cam member 24 and drive lever 20 in position when the mower 10 is being inched forward. If the operator were to remove his hand from the drive lever 20 while inching the mower 10 forward, the force exerted on the cable 26 by the clutch spring would act to return the first cam member 24 to its non-driving position as shown in FIGS. 4 and 5. Therefore an operator presence feature is also provided by the present invention when the mower 10 is being inched forwardly.

The operator presence mechanism is relatively simple in construction and comprised of relatively few parts. The second and third cam members 32 and 34 are carried by the same rod 42, and a single spring 40 engages both the second and third cam members 32 and 34 for biasing both cam members 32 and 34 in the appropriate directions. The same spring 40 also serves to bias the bale arm 22 back to its disengaged position.

I claim:

1. A control mechanism for a walk-behind mower, comprising:

a drive lever control engagable for initiating forward travel of the mower, said drive lever having a non-driven position whereat the mower is not driven forward, said drive lever having a fully engaged position whereat the mower is at full forward speed, said drive lever also being shiftable to intermediate positions for inching said mower forward, said drive lever being biased to return to the non-driven position when an operator releases the lever from the intermediate positions, a locking linkage means for generally locking the drive lever in its fully engaged position, said locking linkage allowing said drive lever to shift back to its non-driven position when an operator releases the drive lever in the intermediate positions, an operator presence lever operatively coupled with the drive lever for returning the drive lever to the non-driven position when the operator presence lever is disengaged, and a lockout linkage means coupled between the drive lever and the operator presence lever for preventing the drive lever from being engaged without the operator presence lever being engaged.

2. The invention of claim 1, wherein said mower is a reel type mower usable for mowing golf course greens.

3. The invention of claim 1, and wherein the lockout linkage means further comprises:

a first cam member operatively fixed for rotation with the drive lever, a second cam member operatively fixed for rotation with the operator presence lever, said second cam member having an interference member which blocks said first cam member and drive lever from rotating from the non-driven position when said operator presence lever is disengaged, said interference member being pivotable with said operator presence lever for providing clearance for the first cam member to pivot to the intermediate positions and the fully engaged position when said operator presence lever is engaged.

4. The invention of claim 3, and wherein the locking linkage means further comprises:

a third cam member operatively coupled with the second cam member for limited relative pivoting therebetween, said third cam member having a finger member generally biased against the first cam member, and the first cam member includes a ledge portion against which said finger portion abuts when the drive lever is fully engaged, said abutment of the finger portion and ledge portion generally preventing the first cam member and drive lever from returning to the non-driven mode.

5. The invention of claim 4, and further comprising:

a single spring in abutment with both the second and third cam members for biasing the second and third cam members in opposite directions, and said spring serves to bias the operator presence lever to the non-driven position and also biases the finger portion of the third cam member into engagement with the first cam member.

6. The invention of claim 4, wherein said first cam member further includes first and second radially extending portions for engaging the interference member and the finger portion, respectively.

7. The invention of claim 3, wherein said mower is a reel type mower usable for mowing golf course greens.

8. The invention of claim 3, and wherein the locking linkage means further comprises:

a third cam member operatively coupled with the second cam member for limited relative pivoting therebetween, said third cam member having a finger member generally biased against the first cam member, and the first cam member includes a ledge portion against which said finger portion abuts when the drive lever is fully engaged, said abutment of the finger portion and ledge portion generally preventing the first cam member and drive lever from returning to the non-driven mode.

9. The invention of claim 8, and further comprising:

a single spring in abutment with both the second and third cam members for biasing the second and third cam members to pivot in opposite directions, and said spring serves to bias the operator presence lever to the non-driven position and also biases the finger portion of the third cam member into engagement with the first cam member.

10. The invention of claim 3, wherein said first cam member further includes first and second radially extending portions for engaging the interference member and the finger portion, respectively.

11. A control mechanism for a walk-behind reel mower, comprising:

a drive lever control engagable for initiating forward travel of the mower, said drive lever having a non-driven position whereat the mower is not driven forward, said drive lever having a fully engaged position whereat the mower is at full forward speed, said drive lever also being shiftable to intermediate positions for inching said mower forward, said drive lever being biased to return to the non-driven position when an operator releases the lever from the intermediate positions, a locking linkage means for generally locking the drive lever in its fully engaged position, said locking linkage allowing said drive lever to shift back to its non-driven position when an operator releases the drive lever in the intermediate positions, an operator presence lever operatively coupled with the drive lever for returning the drive lever to the non-driven position when the operator presence lever is disengaged, and a lockout linkage means coupled between the drive lever and the operator presence lever for preventing the drive lever from being engaged without the operator presence lever being engaged, said lockout linkage including:

a first cam member operatively fixed for rotation with the drive lever, and a second cam member operatively fixed for rotation with the operator presence lever, said second cam member having an interference member which blocks said first cam member and drive lever from rotating from the non-driven position when said operator presence lever is disengaged, said interference member being pivotable with said operator presence lever for providing clearance for the first cam member to pivot to the intermediate positions and the fully engaged position when said operator presence lever is engaged, a third cam member operatively coupled with the second cam member for limited relative pivoting therebetween, said third cam member having a finger member generally biased against the first cam member, and the first cam member includes a ledge portion against which said finger portion abuts when the drive lever is fully engaged, said abutment of the finger portion and ledge portion generally preventing the first cam member and drive lever from returning to the non-driven mode, a single spring in abutment with both the second and third cam members for biasing the second and third cam members to pivot in opposite directions, and said spring serves to bias the operator presence lever to the non-driven position and also biases the finger portion of the third cam member into engagement with the first cam member, and said first cam member further includes first and second radially extending portions for engaging the interference member and the finger portion, respectively.

* * * * *